March 22, 1960    W. H. GROENEWEG ET AL    2,929,382
ROCK RELEASING DEVICE FOR CORN SHELLER CYLINDER CAGES
Filed April 8, 1957

INVENTORS
Walter H. Groeneweg
BY Wallace G. Groeneweg
Ronald L. Groeneweg
Sam J. Slotky
ATTORNEY United States Patent Office 2,929,382
Patented Mar. 22, 1960

2,929,382

ROCK RELEASING DEVICE FOR CORN SHELLER CYLINDER CAGES

Walter H. Groeneweg, Wallace G. Groeneweg, and Ronald L. Groeneweg, Hull, Iowa

Application April 8, 1957, Serial No. 651,375

1 Claim. (Cl. 130—6)

Our invention relates to a rock releasing device for corn sheller cylinder cages.

An object of our invention is to provide an arrangement which will readily release a rock or stone or other object which is fed into a corn sheller or comparable device.

A further object of our invention is to provide a device which will operate in a positive manner in that a series of traps or releasing devices can be used if desired.

Figure 1:
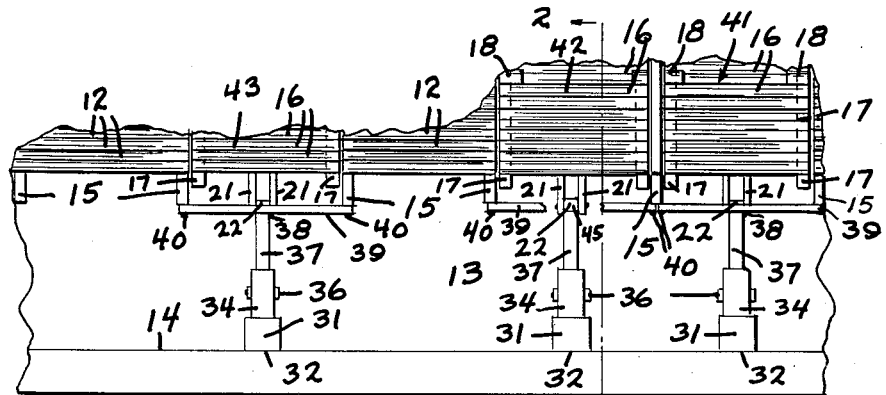
Figure 2:
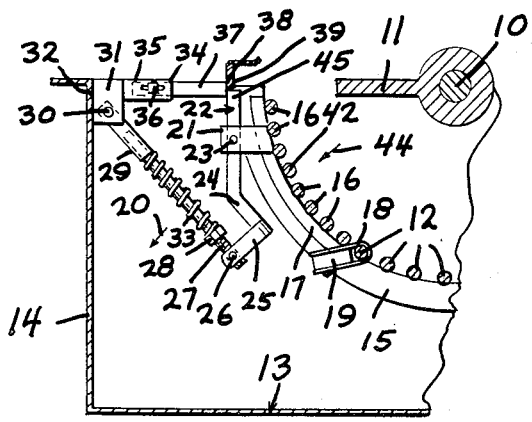

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a plan view of Figure 2 with a fragmentary section being taken at a portion thereof, and Figure 2 is a sectional view taken substantially along the lines 2—2 of Figure 1.

In using corn shellers, one of the disadvantageous features ordinarily encountered is that rocks or stones are picked up and dropped into the shelling cage, and when the auger or rotating portions of the sheller turn, these rocks will be impelled along the cage with severe damage to sheller parts usually being caused, which parts must be replaced or repaired, our invention contemplating a device for eliminating this objectionable feature.

We have used the character 10 to designate generally a longitudinally positioned shaft of the cylinder and cage of the sheller, to which is secured the rotating auger or plate members 11 which serve to carry the ears of corn downwardly against the usual spaced longitudinally positioned cage bars 12, the shelled corn passing between these bars and into the boxing 13, which boxing includes the walls 14. We have further used the character 15 to designate the usual semi-circular brackets which are affixed to the bars 12.

The device of our invention comprises a series of further round bars 16 of the same general shape as the bars 12, which bars are welded to the further arcuate bars 17, the bars 16 being in direct alignment with the bars 12 as shown in Figure 1, but being slightly separated therefrom as will be observed in Figure 1.

One of the lower bars 12 is received within a U-shaped journalling member 18 having the block insert 19, there being a member 18 at either side of each device, the members 18 being welded to the arcuate bars 17, this arrangement thereby providing means whereby all of the bars 16 and the arcuate bars 17 can pivot downwardly in the direction of the arrow 20.

Secured to two of the bars 16 are the side brackets 21 between which is received a vertically positioned trip member 22 which is pivoted at 23 to the brackets 21, the member 22 continuing into the portion 24 which is attached to the U-shaped member 25 to which is pivotally attached at 26 a threaded rod 27 with which is threadably engaged the nut 28.

The rod 27 passes within the square member 29 and is thus arranged to separate therefrom, which member 29 is pivoted at 30 to a U-shaped member 31 which is attached at 32 to the wall 14. A helical compression spring 33 receives the rod 27 and bears against the nut 28 and the end of the member 29.

Secured to the member 31 is a hollow square tube 34 including the slots 35 through which slots passes the bolt 36, which bolt is attached to the adjustable male square bar 37 which is welded at 38 to the transverse strap 39 which is secured as at 40 to the brackets 15. This bar 37 is made adjustable so as to accommodate the bar to varying distances between the tube 34 and the strap 39, which strap 39 is a standard part of the existing cage structure.

The device operates in the following manner. It will be noted in Figure 1 that there are three of such devices built in to the usual cage, certain of the bars of the cage being removed and being replaced with the present devices. As shown in Figure 1, the release device at the extreme right will be indicated by the character 41, the next device by the character 42, and the third device by the character 43. In the longer cages, wherein three of such devices are used, if the rock or stone does not open the first device 41, it will usually open the device 42, and in any event the device 43, so that as a result, the rock is certain to be discharged or released, it being understood, however, that only one device in some cases need be employed if desired.

Figure 2 shows the device in its normal position, and when the rocks (which are much heavier than the ears of corn) are carried around by the member 11, they will strike against the bars 16 substantially in the direction of the arrow 44. This will cause pressure to be exerted against the pivoting point 23 and against the spring pressure of the spring 33, whereby the upper end 45 of the bar 22 will be dis-engaged from the end of the horizontal bar 37 due to the pivoting at 23, which will cause the bars 16 and 17 to pivot downwardly in the direction of the arrow 20, and so that the rock will therefore fall into the boxing 13, 14, and as explained above, if not discharged by the first arrangement, the rock will be discharged by succeeding arrangements. It will be noted that the end 45 of the bar 22 merely bears against the end of the bar 37, and will be instantly dislodged after the impact of the rock against the bars 16.

To re-set the device after the rock has been removed, the end 45 of the bar 22 is placed against the end of the rod 37, and the rod 27 will be re-inserted in the member 29.

As a result it will now be noted that we have provided the advantages mentioned in the objects of our invention, with further advantages being readily apparent.

Some changes may be made in the construction and arrangement of the parts of our invention without departing from the real spirit and purpose of our invention, and it is our intention to cover by our claim any modified forms of structure or use of mechanical equivalents which may be reasonably included within their scope.

We claim as our invention:

A rock releasing device for corn sheller cylinder cages comprising substantially arcuate longitudinally positioned bars forming a part of said cages, frameworks to which said bars are attached, means for pivoting said frameworks to said cylinder cages whereby said bars can pivot outwardly to release rocks driven against said bars, spring urged means bearing against said bars for maintaining said bars in normal position, said spring urged means including a vertically positioned trip bar attached to some of said bars and pivotally mounted with respect thereto, an angularly positioned rod pivotally attached to said trip bar, a coiled helical spring receiving said rod, a female tube receiving said rod, said coiled helical spring bearing against said female tube, said angularly positioned rod including a nut bearing against the other terminal of said spring, a bracket, said female tube being pivoted to said bracket, a lengthened horizontally positioned further bar being attached to said bracket, a laterally positioned strap attached to said horizontally positioned further bar, said strap being secured to the bracket hangers of said cylinder cage, the upper end of said trip bar normally bearing against the end of said horizontally positioned further bar whereby impact of a rock against said bars will cause said upper end to be forced away from said end of said horizontally positioned further bar.

References Cited in the file of this patent

UNITED STATES PATENTS

| | | |
|---|---|---|
| 816,823 | Robby | Apr. 3, 1906 |
| 1,821,316 | Oakes | Sept. 1, 1931 |
| 2,298,830 | McGillis | Oct. 13, 1942 |
| 2,528,232 | Krause | Oct. 31, 1950 |